(12) United States Patent
Arar et al.

(10) Patent No.: US 9,411,417 B2
(45) Date of Patent: Aug. 9, 2016

(54) EYE GAZE TRACKING SYSTEM AND METHOD

(71) Applicant: Logitech Europe SA, Lausanne (CH)

(72) Inventors: Nuri Murat Arar, Lausanne (CH); Jean-Philippe Thiran, Veveyse (CH); Olivier Theytaz, Savigny (CH)

(73) Assignee: Logitech Europe S.A., Lausanne (CH)

( * ) Notice: Subject to any disclaimer, the term of this patent is extended or adjusted under 35 U.S.C. 154(b) by 60 days.

(21) Appl. No.: 14/324,758

(22) Filed: Jul. 7, 2014

(65) Prior Publication Data

US 2016/0004303 A1 Jan. 7, 2016

(51) Int. Cl.
*G06F 3/01* (2006.01)
*G06T 7/00* (2006.01)

(52) U.S. Cl.
CPC .............. *G06F 3/013* (2013.01); *G06T 7/004* (2013.01); *G06T 2207/10016* (2013.01); *G06T 2207/30196* (2013.01)

(58) Field of Classification Search
CPC ......... A61B 3/113; G06F 3/013; G06F 3/011; G06F 9/4443; G06F 3/005; G06F 3/017; G06F 3/0304
See application file for complete search history.

(56) References Cited

U.S. PATENT DOCUMENTS

| | | | |
|---|---|---|---|
| 2006/0238707 A1 | 10/2006 | Elvesjo et al. | |
| 2010/0033333 A1* | 2/2010 | Victor ................... | A61B 3/113 340/576 |
| 2011/0013007 A1* | 1/2011 | Holmberg .............. | A61B 3/113 348/78 |

OTHER PUBLICATIONS

Xuehan, Xiong, et al., "Supervised Descent Method and Its Applications to Face Alignment", Computer Vision and Pattern Recognition (CVPR), 2013 IEEE Conference, pp. 532-539.
Saragih, Jason M., et al., "Deformable Model Fitting by Regularized Landmark Mean-Shift", Int J Comput Vis, 2011, vol. 91, pp. 200-215.
Ebisawa, Yoshinobu, "Improved Video-Based Eye-Gaze Detection Method", IEEE Transactions on Instrumentation and Measurement, Aug. 1998, vol. 47, No. 4, pp. 948-955.
Yoo, Dong Hyun, et al, "A novel non-intrusive eye gaze estimation using cross-ratio under large head motion", Elsevier, Computer Vision and Image Understanding, 2005, vol. 98, pp. 25-51.

\* cited by examiner

*Primary Examiner* — Gerald Johnson

(74) *Attorney, Agent, or Firm* — Kilpatrick Townsend & Stockton LLP

(57) ABSTRACT

An eye gaze tracking system is disclosed. The system includes a gaze data acquisition system including a plurality of light sources and a plurality of image sensors. The plurality of light sources are arranged to emit light to a head of the user, and the plurality of image sensors are configured to receive the light. In an embodiment, the system further includes a gaze tracking module including an ocular feature extraction module, a point of regard (POR) calculation module and a POR averaging module. The ocular feature extraction module is configured to process the gaze data and to extract ocular features, and is configured to determine a confidence value associated with an accuracy of the parameters. The POR calculation module is configured to determine a POR from the ocular features. The POR averaging module is configured to determine an average POR.

17 Claims, 5 Drawing Sheets

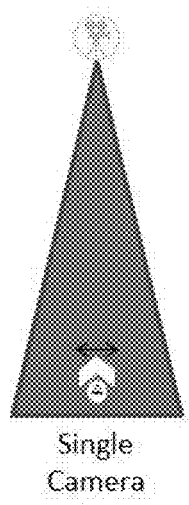
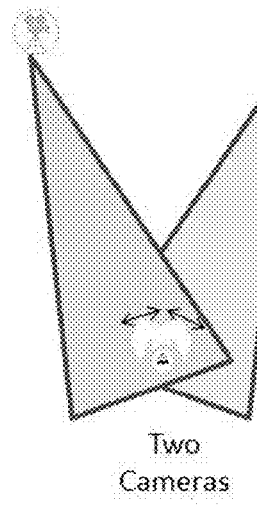
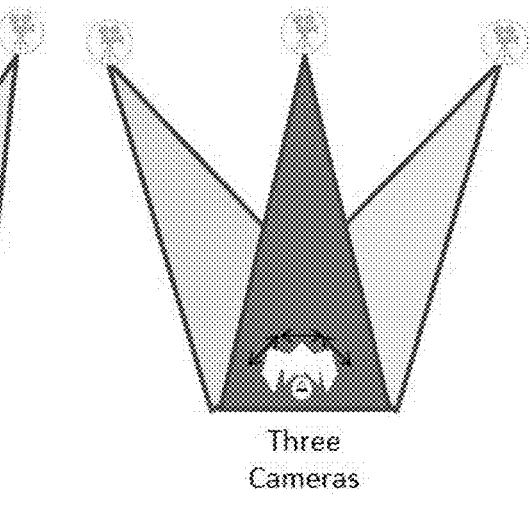
Fig. 8a        Fig. 8b        Fig. 8c
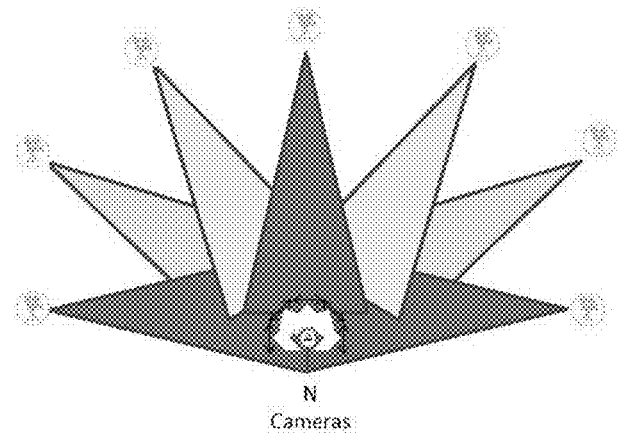
Fig. 8d

EYE GAZE TRACKING SYSTEM AND METHOD

TECHNICAL FIELD

The present invention relates to a system to detect and track eye gaze in connection with graphical user interfaces (GUI). More particularly, the present invention relates to a system to detect and track a point of regard of an eye of a user on the GUI displayed on a display means of a computer device.

DESCRIPTION OF RELATED ART

Human computer interaction typically consists of a user interfacing with a graphical user interface (GUI). The GUI allows a user to interact with the computer through graphical icons and visual indicators as opposed to a command line interface (CUI) such as a text-based interface, typed commands or text navigation.

The rate at which information can be conveyed to a user has been enhanced by developments including: displays with color, increased size and resolution; intelligent graphical objects (for instance pop-up windows); window tabs, menus, toolbars. During such development the functional operation of input devices, that typically consists of a keyboard and a pointing device in the form of a mouse or track ball, has largely remained unchanged. Moreover, intense use of these hand actuated input devices can cause fatigue and repetitive motion injury. The operation of these devices can also be difficult for handicapped users or users with limited hand mobility.

Accordingly, there is a desire to improve user input devices to facilitate user interaction. One approach for improvement is to use eye gaze tracking instead of or to complement a pointing device. With such a system a cursor is positioned on the GUI of the display of the display means according to the calculated point of regard (POR) of a user. Various different technologies exist for tracking the gaze of an eye and can be broadly classified into three categories: eye attached tracking; optical tracking; electric potential measurement. In eye attached tracking an eye attachment, such as a contact lens, comprises a sensor configured to measure eye movement. In optical tracking infrared is typically reflected from the eye and sensed by a video camera or other optical sensor. In electro potential measurement electric potentials are measured by electrodes around the eyes. Generally optical tracking systems are favored as they are non-invasive and comparatively inexpensive.

US2006/0238707 (Elvesjo et al.) discloses an example of an optical tracking system, wherein a high resolution camera and several light sources are arranged around a periphery of a display means. The light sources are configured to operate as two groups. The first group is illuminated such that a bright eye effect for one or both eyes is captured by the camera. This image is subsequently processed by a control unit to determine a center of reflection and center of a pupil and therefrom a gaze vector is calculated. The second group is illuminated to determine the distance of the eye(s) from the camera by means of the pattern of reflection from the light sources in the eye(s). The control unit can determine a POR from the image data of the left eye and right eye and evaluate a position thereof in successive images to thereby track gaze.

A drawback with such system is that if a user moves its head an eye can be located close to or outside of the visual field of the camera. Consequently gaze tracking can be interrupted. Moreover, gaze tracking can be further interrupted if a user moves its head such that an eye is at least partially obscured, for instance by a nose of a user or glasses of a user.

A further drawback is that such a system may not be able to accurately determine gaze for a user wearing glasses. For example, in the image data a reflection of the light sources may overlap the pattern of reflection from the light sources in the eye.

A further drawback is that such a system may not be able to accurately determine gaze for a user during sudden changes light conditions local to the user. For example room lighting being switched on or off or a reflection from the sun.

SUMMARY OF THE INVENTION

An object of the invention is to provide a system to detect and track eye gaze which is operable to more robustly track eye gaze.

It would be advantageous to provide a system which can robustly detect and track eye gaze when a user moves its head even in situations where an eye is located close to or outside of the visual field of an image sensor or is at least partially obscured.

It would be advantageous to provide a system which can accurately detect and track eye gaze of a user who wears glasses.

It would be advantageous to provide a system which can accurately detect and track eye gaze of a user when the user moves their head quickly in various directions.

It would be advantageous to provide a system which can accurately detect and track eye gaze of a user during sudden changes in the light conditions local to the, for example room lighting being switched on or off or a reflection from the sun.

It would be advantageous to provide a system to detect and track eye gaze which is easy and convenient to use.

It would be advantageous to provide a system to detect and track eye gaze which is efficient such that its operation does not require high computational overheads, and is economical to produce.

Disclosed herein is an eye gaze tracking system for determining a point of regard (POR) of a user, the system comprising:
  a gaze data acquisition system comprising a plurality of light sources and a plurality of image sensors, the plurality of light sources arranged to emit light to a head of the user, and the plurality of image sensors configured to receive light from the head of the user to capture gaze data thereof;
  a gaze tracking module comprising an ocular feature extraction module, a POR calculation module and a POR averaging module,
wherein the ocular feature extraction module is configured to process the gaze data and to extract in relation to each image sensor a set of ocular features, and is further configured to determine, for each set of ocular features related to a captured frame, a confidence value associated with an accuracy of the parameters.

In an embodiment, the POR calculation module is configured to determine an estimated POR value from the ocular features related to glint locations and location of pupil center for each image sensor independently.

In an embodiment, the POR averaging module is configured to determine the confidence value of the estimated POR, said confidence value being proportional to weight factors related to head pose angle of the user and feature detection reliability.

In an embodiment, the POR averaging module is configured to determine a corrected POR value from the confidence value and the estimated POR from each set of ocular features captured for each frame.

In an embodiment, the POR averaging module is configured to determine a corrected POR value for each set of ocular features from a weighted average calculation based on the estimated POR's and the confidence values of each estimated POR.

In an embodiment, the POR averaging module is configured to determine a corrected POR value for each set of ocular features based on the estimated PORs and the confidence values of each estimated POR, wherein only the corrected POR equals the estimated POR with the highest confidence value.

In an embodiment, the gaze tracking system is further configured to determine a POR of a user on a display, wherein said display is in communication with a computer device.

In an embodiment, the eye gaze tracking system is operationally connected to a computer device and the display, and wherein the determined POR is configured to be received in the computer device, such that a cursor or an item on the screen is following the POR of the user.

In an embodiment, the gaze data acquisition system comprises four light sources, each of the four light sources preferably located in each corner of the four corners of a monitor, and one light source located in the optical axis of each camera sensors.

In an embodiment, the image sensor is a camera configured to produce a stream of captured video data comprising the ocular data.

Also disclosed herein is a method for determining a point of regard (POR) of a user, using a gaze data acquisition system comprising a plurality of light sources and a plurality of image sensors; said method comprising the steps of:
- detecting the location of the eyes of a user by illuminating a facial region with the light sources and capturing reflected light with each image sensor,
- continuously tracking the eye position of the user once the eyes have been detected,
- measuring the location of glints by capturing the glints in the image sensors independently and calculating the coordinates of the glints in a POR calculation module,
- measuring the location of the pupil by illuminating the pupil and capturing a reflected pupil image,
- calculating an estimated POR value from the glint locations and the each eye and for each image sensor independently in a calculation module of the calculating unit,
- determining for each image sensor a confidence value ($\sigma$) of the estimated POR, wherein captured parameters are compared to predetermined data ranges, In an embodiment, a corrected POR value is determined by using the confidence value as a weight factor and performing a weighted average calculation of the estimated POR's from the light sensors.

In an embodiment, a corrected POR value is determined by analyzing the confidence value of each estimated POR, whereby only the estimated POR with the highest confidence value is considered for determining the corrected POR value.

In an embodiment, the confidence value is calculated from head pose estimation, feature detection reliability and user distance, and wherein a separate confidence value is calculated simultaneously for each estimated POR value from each image sensor and for each eye.

In an embodiment, a total confidence value is determined by a pre-estimation of the confidence value based on gaze data and a post estimation of the confidence value, whereby the post estimation determines data outliers in the estimated PORs.

In an embodiment, the locations of the eyes are only detected one time, preferably at the beginning of a session where after the eye positions are continuously tracked.

In an embodiment, the at least four glints are captured and entered in the gaze tracking module as corners of a trapezium.

In an embodiment, the estimated POR value is calculated by a cross-ratio based module in which the image of the reflected image is compared to the geometry of the display.

An aspect of the invention is directed to an eye gaze tracking system to determine a point of regard (POR) of a user. The eye gaze tracking system comprises a gaze data acquisition system comprising a plurality of light sources and a plurality of image sensors. The plurality of light sources are arranged to emit light to a head of the user, and the plurality of image sensors configured to receive light from the head of the user to capture gaze data thereof. The system further comprises a gaze tracking module comprising an ocular feature extraction module, a POR calculation module and a POR averaging module. The ocular feature extraction module is configured to acquire the gaze data and to extract for each image sensor a set of ocular features, and is further configured to determine for each set of ocular features a confidence value associated with the accuracy of the parameters. The POR calculation module is configured to determine a POR from each set of ocular features. The POR averaging module is configured to determine an average POR based on a summation of the product of the POR and associated confidence value for each set of ocular features. In an advantageous application of the invention, the eye gaze tracking system is configured to determine a point of regard (POR) of a user on a display of a display means of a computer device.

Advantageously, the system can robustly track eye gaze since the POR is calculated from image data captured from a plurality of image sensors. Moreover, image data obtained from image sensors which is less accurate can be given less weight when calculating the average POR due to the associated confidence value. For example, a lower confidence value can be set when: when there is strong head pose which causes more distortion of features and sometimes occlusion, when the detected features are not reliable, when the user is not close the image sensor which causes to obtain a low resolution data, when a user moves their head such that an eye is at least partially or fully obscured to the image sensor; when the image data of a particular image sensor is contaminated by glasses of a user or other light propagation local to the user.

One of the important advantages of the multiple camera eye tracking system according to the invention is that multiple cameras allow a higher working volume compare to a single camera system.

Various features herein may be combined to provide combinations other than those specifically illustrated and described. Further objects and advantageous features of the invention will be apparent from the claims, from the detailed description, and annexed drawings.

BRIEF DESCRIPTION OF THE DRAWINGS

For a better understanding of the invention, and to show how embodiments of the same may be carried into effect, reference will now be made, by way of example, to the accompanying schematic drawings in which:

FIGS. 8a to 8d illustrate tracking volumes in relation to different camera setups.

DETAILED DESCRIPTION OF EXEMPLARY EMBODIMENTS

Figure 1:
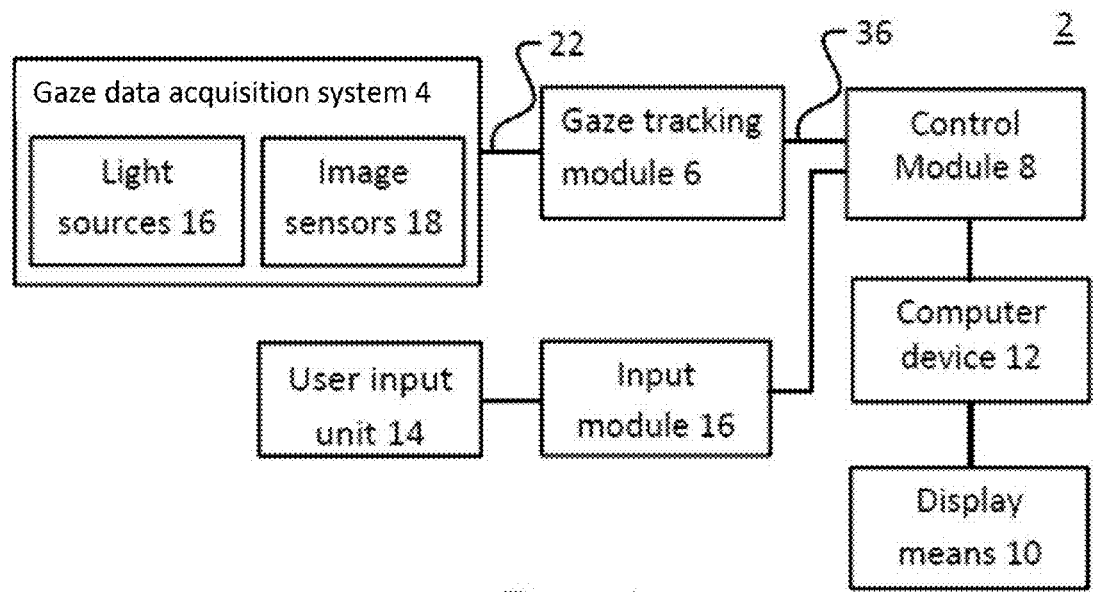
FIG. 1 is a block diagram showing a system to detect and track eye gaze according to an embodiment of the invention.

FIG. 1 shows a block diagram of an abstraction of an eye gaze tracking system 2 to track eye gaze using an optical method. The eye gaze tracking system 2 comprises a gaze data acquisition system 4 that consists of hardware configured to acquire gaze data from a user of the eye gaze tracking system 2. A gaze tracking module 6 comprises software to acquire and process the gaze data to determine gaze related ocular features. The ocular features are further processed to determine point of regard (POR) data, wherein the POR is defined as the gaze point of the user in two-dimensional coordinates on a plane defined by a display 20 of a display means 10. A control module 8 is configured to acquire the POR data 34 from the gaze tracking module 6 and to control a computer device 12 at least partially using the POR data 34.

The eye gaze tracking system 2 may further comprise a user input unit 14 comprising an input device, for instance, a peripheral input device such as a keyboard and a pointing device. The input device is operated by the user to specify input data corresponding to an instruction of a user. An input module 16 is configured to acquire the input data from the input unit 14 and to interpret the input data to provide user commands to the control module 8 corresponding to the instructions. The commands may for example be a "select object command", "move object command", or "interrogate object command", wherein the object is displayed on a graphical user interface (GUI) on the display means 10 and the POR data is used to determine the particular object to which the command relates. The control module 8 is further configured to acquire the user commands and to control a computer device 12 based on the commands.

Figure 2:
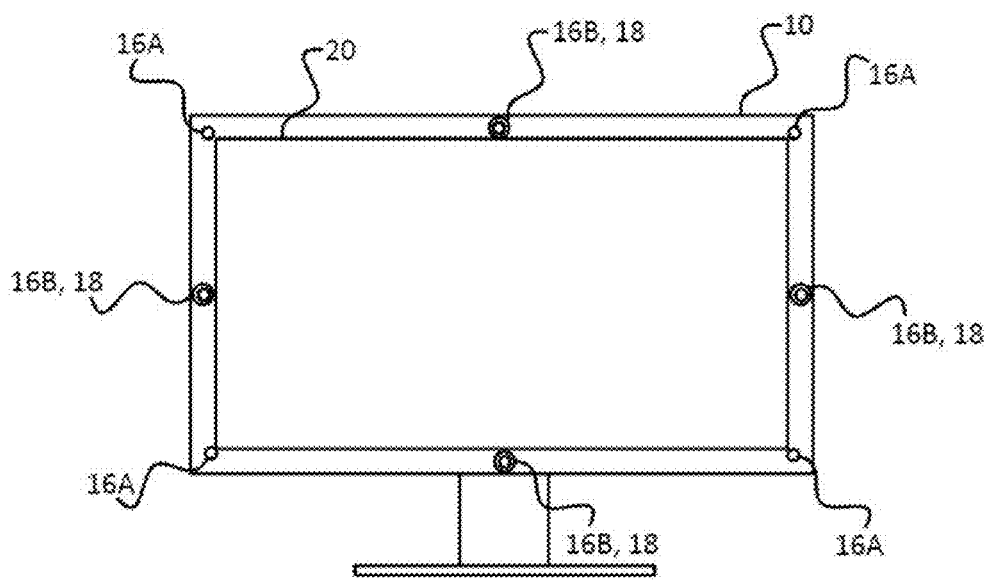
FIG. 2 is an illustrative view showing an embodiment gaze data acquisition system of the system of FIG. 1.

The aforementioned blocks will now be described in more detail and in accordance with an exemplary first embodiment of the invention. The gaze data acquisition system 4 comprises light sources 16 and image sensors 18. A first embodiment of a gaze data acquisition system 4 is shown in FIG. 2, wherein the light sources 16 are arranged into a first group of light sources 16A which are disposed on the display means 10 discrete from the image sensors 18. In this example there are four first group light sources 16A that are arranged at peripheral corners of the display 20 of the display means 10. The light sources 16 are further arranged into a second group of light sources 16B which are disposed co-axial to an optical axis of a lens of the image sensors 18. In this example there are four image sensors 18 which are disposed on a periphery of the display means 10 intermediate the peripheral corners.

It will be well understood that the positioning of the light sources 16 and camera setups are not limited to the illustrated examples. Other positioning and setups may be used with co-axial or substantially co-axial configurations. In other examples of the first embodiment gaze data acquisition system 4 there may be any number of image sensors 18 greater than one, which are arranged in any manner on the display means 10 such that they are able to receive light from the head of the user to capture gaze data thereof. For instance, an example with two or three image sensors 18 can be achieved by omitting one or two image sensors 18 from the example shown in FIG. 2. In an advantageous example the image sensors 18 are spaced as far apart from each other as possible. It will be appreciated from the following that with such an arrangement the accuracy of the averaged POR P is optimized. A symmetrical positioning advantageously enhances the accuracy of the average POR P.

The light sources 16 are arranged to emit light to a head of the user operating the computer device 12. They are operable to emit light in the visible and/or infrared (IR) frequencies of electromagnetic radiation. As a non-limited example, one can use a light sources in the NIR range (700 nm-1 mm), such as Everlight HIR7343C/S19 LEDs having 850 nm wavelength, or any other type of NIR LEDs. The image sensors 18 comprise a camera operable to capture image data of the head or the face of the user, and in particular the eyes of the user. For example the camera may be a CCD or CMOS camera. Suitable image sensors are NIR sensitive (monochrome). For instance, cameras such as uEye UI-3240CP-NIR, UI-12405E-NIR, Point Grey Flea3 FL3-U3-13Y3M-C can be used, but any other NIR sensitive camera would work. Advantageously these cameras can be placed within the frame of the display with a dead front effect, the dead front serving as band pass filter for IR frequencies.

The gaze data acquisition system 4 may further comprise a control module configured to control the operation of the light sources 16 and image sensors 18, for example, to sequentially switch an operative state between one or more light sources of the first group 16A and second group 16B of light sources, whilst controlling the image sensor to acquire image data for each state. The image data, referred to as gaze data 22 captured by the image sensors 18 is transmitted from by the gaze data acquisition system 4 to the gaze tracking module 6.

The display 20 of the display means 10 may comprise any of known computer device screen or monitor, as well as combinations of two or more separate displays. For example, the display 20 may constitute a regular computer screen, a stereoscopic screen, a heads-up display (HUD) in a vehicle, projector screen or a head-mounted display (HMD).

The computer device 12 may comprise any one from the group consisting of a personal computer, a computer workstation, a mainframe computer, a processor in a vehicle, or a handheld device such as a cell phone, portable music player (such as e.g. an iPod™ player), a laptop computer, a computer tablet, a computer game, electronic books and similar other devices.

The gaze tracking module 6 will now be described with reference to FIGS. 3 and 4 in particular. The gaze tracking module 6 may be implemented on the computer device 12, for example as a program installed and run by the operating system. Alternatively it may be provided on a separate device, such as a peripheral device in communication with the computer device 12, or a combination of the two.

Figure 3:
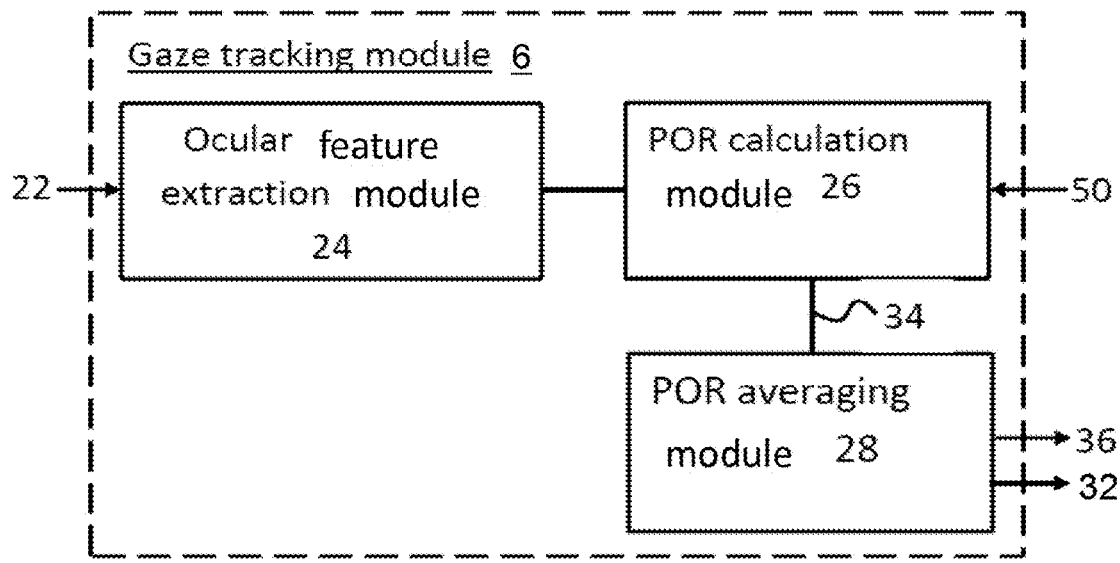
FIG. 3 is a block diagram showing an embodiment gaze tracking module of the system of FIG. 1.

As shown on FIG. 3, the gaze tracking module 6 comprises an ocular feature extraction module 24, a POR calculation module 26 and a POR averaging module 28. The ocular feature extraction module 24 is configured to acquire and process the gaze data 22 from the gaze data acquisition system 4 and to extract from an image provided by each image sensor 18 a set of ocular features, referred to as ocular feature data 30. In the context of this invention, the gaze data comprises all captured data required for calculating the POR P of a user. The gaze data comprises the head pose angle and the distance from the eyes to the display means 10. The ocular feature data comprises data from the eyes, specifically the location of glints and the pupil center. The ocular feature extraction module 24 is further configured to determine for each set of ocular features a confidence value $\sigma_n$, referred to as confidence value data 32.

The POR calculation module 26 is configured to determine a POR P from each set of ocular features, referred to as POR data 34. The POR averaging module 28 is configured to determine an average POR, referred to as averaged POR data 36, based on a summation of the product of the POR and associated confidence value $\sigma_n$. The operation of each of these modules will now be described in more detail.

Figure 4:
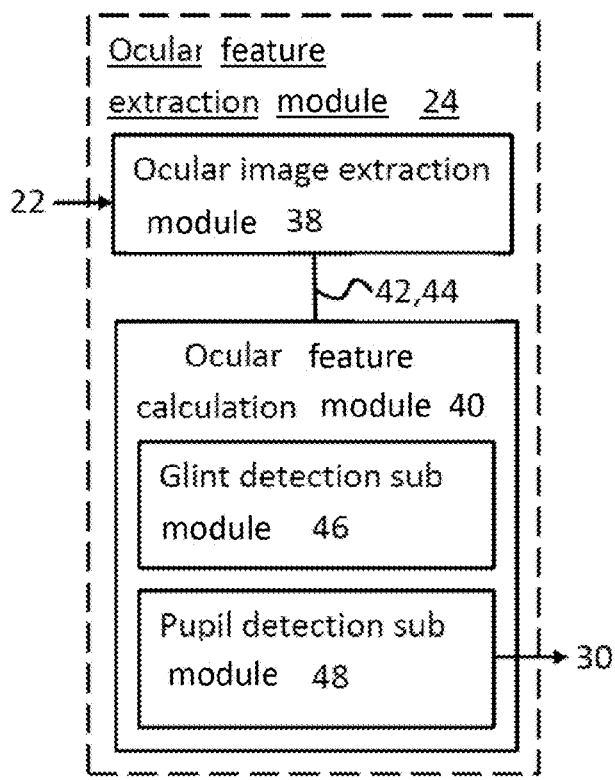
FIG. 4 is a block diagram showing an embodiment ocular feature extraction module of the gaze tracking module of FIG. 3.

With specific reference to FIG. 4, the ocular feature extraction module 24 comprises an ocular image extraction module 38 and an ocular feature calculation module 40. The ocular image extraction module 38 is configured to process the captured image frames of the gaze data 22, and for the data relating to each image sensor 18 detect and extract an eye region comprising at least one of the eyes of the user, referred to herein as eye region data 42. Isolated images of the eye region data 42 are then sent to the ocular feature calculation module 40 for calculation of the ocular feature data 30.

The ocular image extraction module 38 is an image processing module, which in an advantageous example is a facial tracking module. It will be well understood that other suitable image processing modules can be used. The facial tracking module can be configured to track facial points, such that a reduced number of points are tracked. Advantageously a Supervised Descent Method based facial points tracker [X. Xiong and F. De la Torre, Supervised Descent Method and Its Applications to Face Alignment. IEEE Conference in Computer Vision Pattern Recognition (CVPR), pages 532-539, June 2013.] also called SDM tracking module is used as face tracker. Other trackers may also be suitable trackers such as CLM tracker, AAM tracker or OpenCV tracker.

In the example, the image extraction module 38 is operable to detect an eye region and to continue to track the eye region as opposed to continuously performing the process of detecting the head followed by the face and then the eye region for each image frame. In this way computational overhead is reduced. Such an operation can be achieved by locating the head region, then the face region and subsequently the eye region on an image frame. Then processing on a subsequent image frames only the part of the image frame which location corresponds to the eye region on the preceding frame. If an eye region cannot be determined on a subsequent frame then the full frame is processed once again to detect the head, face and then the eye region. Otherwise, the module may continue to process only the eye region of subsequent frames. Advantageously a SDM tracking method and its applications to Face alignment is used. It will be well understood that other face tracking modules such as an AAM tracker, OpenCV tracker, or a non rigid face tracker such as the one provided in "'Deformable Model Fitting by Regularized Landmark Mean-Shift', In Int. J. Comput. Vision, vol. 91, no. 2, pp. 200-215, 2011" may also be used.

The ocular feature extraction module 24 may also extract head pose information data 44 from the gaze data 22. The head pose information data can be obtained by analyzing facial points adjustments in a 3D face model. In case there is no 3D model, still head pose can be determined by looking at some specific facial points adjustment such as eye corners, mouth corners and nose.

The ocular feature calculation module 40 comprises several sub modules which are configured to calculate specific ocular features from the eye region data 42. In this example the ocular feature calculation module 40 calculates ocular features comprising the location of glint and parameters comprising the location of the center of the pupil for one or both eyes. Accordingly, it comprises a glint detection sub module 46 and a pupil detection sub module 48.

The glint detection sub module 46 is configured to calculate a location of glint, also referred to as corneal reflection, in the cornea caused by reflected light emitted from a light source. For a plurality of light sources, the glints show up as bright spots in an ocular region image, the location of which being a projection of the location of the light sources 16 on the display means 10. The location of the glints can be determined by means of an image processing module which is operable to sense the high hue intensity values of the glints.

In an example the image extraction module 38 may segment the eye region data 42 by an adaptive threshold value. Image processing algorithms are used to precisely localize the glints: a first step of histogram equalization is performed followed by a step of thresholding on the input image which results in a binary image. Adaptive thresholding is used to avoid tuning the threshold parameter. Then the binary image is processed by morphology operations to get rid of the small blobs caused by noise. In the resulting binary image, four blobs form a trapezium since they emerge by the reflections of four NIR LEDs located on the corners of a computer monitor. Therefore, the candidate glints by performing connected component analysis are obtained. If there are four or more candidate glints remaining, a step consists in checking the rectangularity of the shapes formed by any four-glints combination. The set of candidates whose convex hull has the highest rectangularity is considered as the final glint features.

Figure 5:
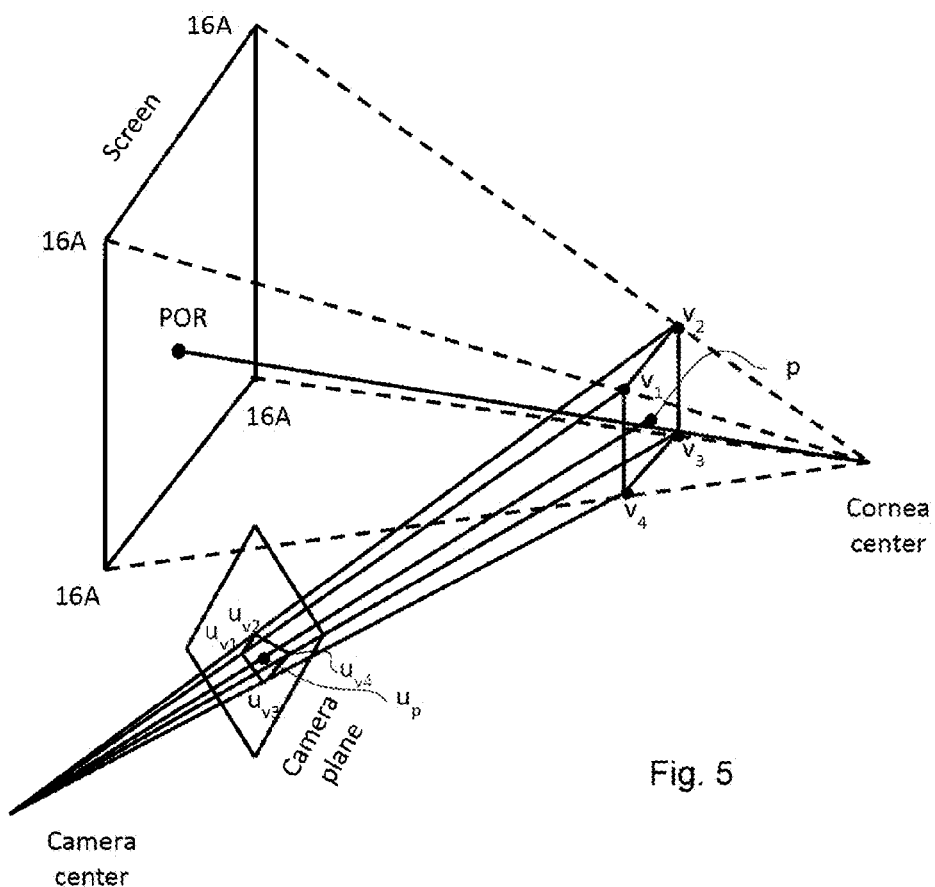
FIG. 5 is an illustrative view showing a relationship between light sources of the gaze data acquisition system of FIG. 2 and glint locations in an eye of a user.

In the first embodiment of the gaze data acquisition system 4 of the FIG. 1, 2 and as further shown in FIG. 5, the first group of light sources 16A) are switched to an operative state to provide four glints $u_{v1}$, $u_{v2}$, $u_{v3}$ and $u_{v4}$ in the captured image of an eye which are a projection of the location of the peripheral corners of the display 20 of the display means 10. The 2-dimensional location of the glints is outputted by the glint detection sub module 46 as ocular feature data 30.

The pupil detection sub module 48 is configured to calculate the location of the pupil and in particular may calculate the location of the center of the pupil.

In an example the pupil detection sub module 48 may be configured to calculate the location of the pupil using the method disclosed in. 'Improved Video-Based Eye-Gaze Detection Method', E Y. Ebisawa, in IEEE Trans. Instrumentation and Measurement, vol. 47, no. 2, pp. 948-955, August 1998. This method exploits the property that the intensity of an image of a pupil sensed by an image sensor varies as a light source illuminating the pupil is moved away from the image sensor. The overall principle is illustrated in FIGS. 6g and 6h. In particular, FIG. 6h illustrates when an IR LED is located in the optical axis of a camera, the pupil is shown as a bright region in an image. On the other hand, as shown in FIG. 6g, when the IR LED is far from the axis of the camera, the pupil becomes darker.

Figure 6A:
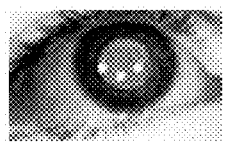
FIGS. 6a to 6h show image data of an eye region of a user of the system of FIG. 1.
Figure 6C:
Figure 6E:
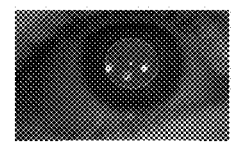
Figure 6B:
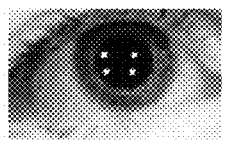
Figure 6D:
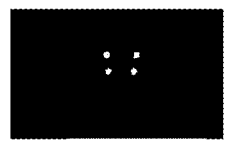
Figure 6F:
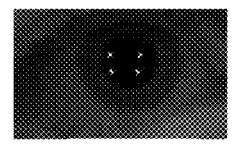
Figure 6G:
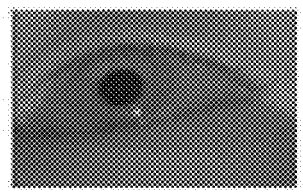
Figure 6H:
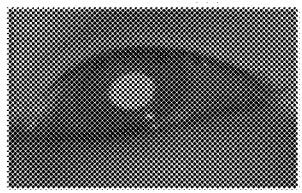

Using the first embodiment of the gaze data acquisition system 4 shown in FIG. 2 as an example, an image captured by the sensor 18 comprising the light source 16B is as shown in FIG. 6a, wherein the pupil is shown as a bright pupil when the light source 16B of a particular image sensor 18 is switched to an operative state and the first group of light sources 16A are switched to an inoperative state. Conversely, as shown in FIG. 6b, the image captured by the sensor 18 comprising the light source 16B is as shown in FIG. 6b, wherein the pupil is shown as a dark pupil when the light source 16B of the particular image sensor 18 is switched to an inoperative state and the first group of light sources 16A are switched to an operative state. The control unit of the gaze data acquisition system 4 is configured to switch between the operational states of the light sources over a short time interval. The pupil detection sub module 48 is configured to process eye region data 42 comprising the bright and dark pupil images and to determine a difference image, as shown in FIG. 6d, which based on the intensity difference between the two images. The pupil detection sub module 48 may be further configured to determine the center of the pupil from a suitably sized region of the difference image which has the highest intensity value. Alternatively, the pupil detection sub module 48 may be configured to produce a segmented difference image as shown in FIG. 6f by a threshold value (as discussed for the glint detection sub module 46) and to determine the center of the pupil from the resultant binary image and output an image of detected glints as shown in FIG. 6e.

The pupil detection sub module 48 outputs the 2-dimensional location of the center of the pupil as ocular feature data 30. The cameras 18 and the light sources 16 can be synchronized using a printed circuit board with a microcontroller. The light sources 16 for each camera 18 are switched on and off simultaneously. For instance, for the first frame, all light sources 16 are turned on and all the cameras' light sources are turned on for the second frame. The POR calculation module 26 outputs the POR P for each image sensor 18 for one or more eyes of the user as the POR data 34. Accordingly, for each point in time the stream of POR data 34 comprises a set of PORs consisting of PORs relating to each image sensor, wherein for each image sensor there are one or two PORs for one or both eyes. A flag may be set in the data stream in cases where the ocular feature tracking module 24 could not determine the ocular features or the POR calculation module 26 could not determine the POR for one or both eyes.

Figures 7A, 7B:
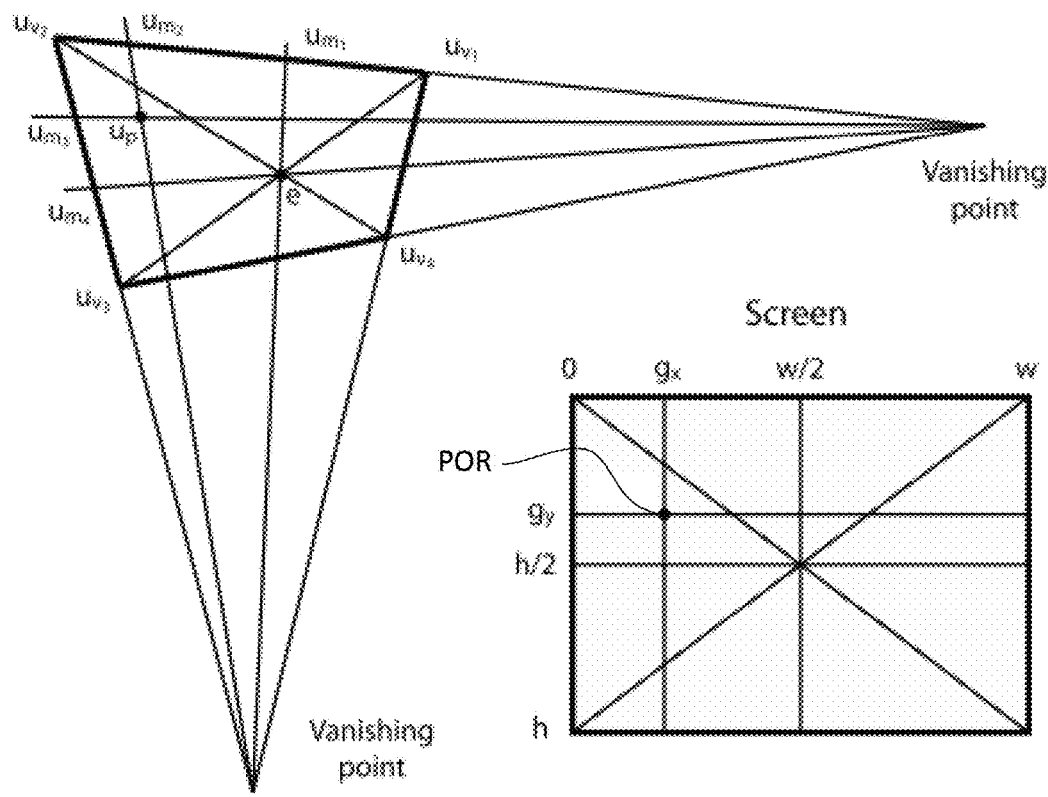
FIGS. 7a and 7b illustrate aspects of a cross-ratio calculation to determine a point of regard of a user of the system of FIG. 1.

An exemplary method of determining the POR of a user will now be described in relation to FIGS. 5, 7a and 7b. Referring to FIG. 7b, which shows a display provided with width w and height h and with a first group light sources 16A. In the current example, the light sources are located in the corners of the display. An additional light source 16B in the form of an infra-red light source is located in the optical axis of at least one of the image sensors in order to create a bright-pupil effect and locate the center of the pupil.

When a user is looking on the display, his POR P is located at a point on the display which can be defined in terms of 2-dimensional coordinates x, y relative to the display. The x coordinate is located on an axis defined by the width direction of the display and the y coordinate is defined on an axis defined by the height of the display. According to the present method, the light sources are illuminating the head of a user and reflected light data from the head of the user are captured with each image sensor 18. The four light sources 16A are producing four corneal reflections (i.e. glints) in the user's eye $v_1$, $v_2$, $v_3$ and $v_4$, such that corners of a reflected polygon can be defined by the glints. The polygon formed by the four corneal reflections is therefore the projection of the display, and the pupil center is located within the area defined by the reflected polygon. A second projection takes place from the corneal plane to the image plane, such that the points $u_{v1}$, $u_{v2}$, $u_{v3}$, $u_{v4}$ and a projection of the pupil center $u_p$ are obtained in a captured camera image.

The gaze data and the ocular features are determined by illuminating the head of a user with the light sources and capturing the reflected light data from the head of the user with each image sensor. The ocular features comprise location of the glints, and the location of pupil center.

The POR P of the user on the display can be determined in the POR calculation module 26. The POR calculation module 26 is establishing a correspondence between the geometry of the display and the ocular features represented by the captured reflected polygon image represented by the four corners $u_{v1}$, $u_{v2}$, $u_{v3}$ and $u_{v4}$. In order to determine from the measured reflected polygon in the user's eyes to which point on the display the user is looking, a correspondence between the coordinate system of the display and the coordinate system of the reflected polygon image needs to be determined. Therefore a cross-ratio method is used in order to determine the POR on the display. An example of a suitable cross-ratio method is disclosed in the aforementioned reference of .H. Yoo and M. J. Chung. *A Novel Non-Intrusive Eye Gaze Estimation Using Cross-Ratio under Large Head Motion. In Computer Vision and Image Understanding*, vol. 98, no. 1, pp. 25-51, April 2005.

Specifically, when the user looks at the display, the POR P is projected onto the corneal plane of the eye by the same projection as the LEDs are projected on the corneal reflections. Therefore, the image of the pupil center can be used to estimate gaze direction. The present method uses a cross-ratio of four points on a line, which is invariant under a planar projective transformation.

In order to estimate the coordinates x, y for the POR P, the center of the pupil needs to be mapped to the display 20. To that effect, the method uses the relation between the cross-ratio of a configuration formed by the corneal reflections $v_1$, $v_2$, $v_3$ and $v_4$ and the center of the pupil $u_p$ in the reflected image, and the cross-ratio of the light sources 16A and the unknown POR P. The cross-ratio of the display 20 is calculated as follows:

$$CR_{screen}^x = \frac{(w - \frac{w}{2})\hat{g}_x}{(w - \hat{g}_x)\frac{w}{2}} = \frac{\hat{g}_x}{w - \hat{g}_x}$$

where w is the width of the display 20 and is the $\hat{g}_x$ coordinate of the estimated POR P.

The cross-ratio of the virtual corneal reflections and the pupil center is calculated as follows:

$$CR_{image}^x = \frac{|u_{v1} u_{m1}||u_{m2} u_{v2}|}{|u_{v1} u_{m2}||u_{m1} u_{v2}|}$$

Since the cross-ratio of both configurations have to be the same, it is possible to determine the x and y coordinates of the POR as following:

$$\hat{g}_x = \frac{w}{1 + CR_{image}^x}$$

A similar derivation gives the estimated y coordinate of the POR, $\hat{g}_y$, as following:

$$\hat{g}_y = \frac{h \cdot CR^y_{image}}{1 + CR^y_{image}}$$

where h is the height of the display 20.

Geometric parameters relating to the display 20, such as the width w and height h of the display 20 are supplied to the POR calculation module 26 as display means parameter data 50. This data can for example be manually input by the user, for instance by using the user input unit 14, and supplied to the control module 8. It may also be determined by the control module 8 by interrogating the computer device 12.

The ocular features in terms of location of the glints $u_{v1}$, $u_{v2}$, $u_{v3}$, $u_{v4}$ and the pupil center $u_p$ are continuously captured during the use of the eye gaze tracking system 2. The ocular feature extraction module 24 within the gaze tracking module 6 is continuously acquiring ocular input data. A POR parameter calculation module 26 within the gaze tracking module 6 is determining a POR P from each set of ocular features.

Most of the existing single-camera systems suffer from a lack of information when the user turns his head more than a specific angle because some part of the face or eye might be partly or fully invisible. Therefore, the features cannot be detected and tracked accurately which decreases the performance of such a system.

As illustrated in FIGS. 8*a* to 8*c*, the use of several cameras (in FIGS. 8*b*, 8*c* and 8*d*) allow an increased tracking volume and enables unseen regions to be reconstructed or compensated with the help of other cameras. Additionally, the results of each camera setup may be combined to provide a more accurate final result. The fusion of multiple independent camera systems according to the present invention is therefore able to provide a more accurate POR estimation under large head pose. In addition, the tracking volume is increased since there are more than one camera capturing the user from different viewing angles. According to the camera system of present invention, several cameras are combined to increase the accuracy of eye tracking, allow a higher working volume and provide robustness against large head movements, changing illuminations, and the use of eye glasses in comparison to a single camera system.

According to the present invention, weighted averaging of independent camera systems may be used in order to determine the data reliability and to reduce the risk of taking into account data outliers. Therefore the gaze tracking module 6 indicates the eye detection reliability and feature detection reliability in order to determine the confidence value, i.e. the data reliability of the detected glints location and the pupil center location. The weighted averaging of independent camera systems involves running a gaze estimation algorithm on each camera setup independently. The algorithm preferably outputs information including POR estimation for both left and right eyes, 3D head pose with yaw, pitch and roll angles, face model fitting reliability which also indicates the eye detection reliability, and feature detection reliability meaning how confident the system detected the glints and the pupil center. One or more of these cues are used to calculate the reliability, also called confidence level of each independent camera setup's POR output. The confidence levels are then used as weights for the fusion by weighted averaging as follows:

$$\Omega_{overall}(x, y) = \sum_{n=1}^{N} \sigma_n PoR_n(x, y)$$

where $\sigma_n$ is the confidence level of $n^{th}$ POR estimation, and $POR_n$ is the x and y coordinates of the $n^{th}$ POR estimated. It is also important to note that the sum of confidence levels $\Sigma_{n=1}^{N} \sigma_n$ is equal to 1.

The confidence value in $\sigma_{overall}$ of all POR:s from each independent camera setup's output is analyzed. In particular, the total confidence value may depend on several individual factors such as head pose, feature detection reliability and user distance. The accuracy of eye gaze data is higher under small head pose frontal than large head pose. Therefore, head pose angle from each independent camera would definitely affect the weighting such that we will assign higher weights to the independent camera setups which have lower head pose angle, and respectively lower weights will be assigned to those having higher head pose angle. More specifically, the face tracker of the present invention runs successfully when the head pose yaw angle is between −35° and +35°. In order to define the confidence value $\sigma_n$ from the head pose angle, a weight between 0 and 1 is assigned for each frame of each image sensor. For instance, 0 is assigned if absolute yaw angle is greater than 30°, while 1 is assigned if it is 0. If the angle is between 0° and 30°, then the weight assignment is as follows:

$$W_{hp}^n = \frac{angle_{max} - |angle_n|}{angle_{max}}$$

where angler is the head pose yaw angle of the frame, $angle_{max}$ is the highest allowed angle, set to 30°.

The feature detection accuracy also affects the performance of the eye tracker. The extracted eye region may not be accurately detected due to e.g. strong or weak luminance, reflections on eye glasses, reflections on the sclera, high eyeball pose etc. For such abnormal cases, inaccurate glint detections, additional fake glints and/or missing real glints, or inaccurate pupil center detection may be captured.

Depending on the quality of the feature detection, a feature detection reliability for each frame of each independent camera setup is assigned. In order to achieve more accurate system in the end, feature detection reliabilities are calculated by assigning less weight for those having less reliable feature detection for a given frame. More specifically, shape comparison is used as a way of weighting the feature detection for each frame. Since four glints emerge by the reflections of four NIR LEDs located on the corners of the computer monitor, the detected blobs in the eye image should form a trapezium.

A shape comparison function such as OpenCV's "matchShapes" can be used in order to compare resulting feature detection trapezium with a template rectangle representing the monitor.

The function is first used to determine final four glints combination in case there are more than four candidate glints. The rectangularity of the shapes formed by any four glints combination is then checked. The four glints combination having the highest rectangularity is chosen as the final-glints features. Then, the function returns a value between 0 and 1 by considering the final four glints combination. The feature detection reliability factor is calculated as:

$$W_{fd}^n = \begin{cases} 0 & \text{if } x_n \geq x_{max} \\ \frac{x_{max} - x_n}{x_{max}} & \text{if } x_n < x_{max} \end{cases}$$

where $x_n$ is the returned similarity value of two shapes, $x_{max}$ is the highest allowed dissimilarity, set to 0.5.

Furthermore, in case the system is integrated with a large display, under natural utilization of the eye tracker, not only head pose changes but also the user can change the distance and the position of the body relative to the display by moving left, right, front or back. Therefore, the user distance to each independent camera setup changes over time. This distance would possibly affect the gaze estimation accuracy because when the user is far from any of the cameras, the resolution will be lower. Even though the face tracker and the feature detector return successful outputs, the results are more sensitive to the detected features due to a lower resolution. Hence, the user distance will be determined by the scale of the detected face rectangle. In such scenarios weights may be assigned, $W_{ud}$, inversely proportional to the user distance to a given independent camera system. However, if the present invention is used with small sized monitors like laptops, tablets, smart phones etc., the change in user distance to cameras is very small, whereby the user distance measurement can be excluded in the calculation of the confidence value.

Once all influencing factors are analyzed, for each frame, their corresponding outputs, a sub-weight value whose range is between 0 and 1, are uniformly combined by averaging sub-weight values in order to set a single pre-estimation confidence value per each estimated POR P. The pre-estimation reliability factor is calculated from the following formula:

$$W_{pre}^n = \frac{W_{hp}^n W_{fd}^n W_{ud}^n}{\sum_{i=1}^{N} W_{hp}^i W_{fd}^i W_{ud}^i}$$

In addition, we perform a post-estimation weighting in order to eliminate the effect of outliers. In an ideal case where each camera output two PORs—left and right eye outputs—, there are two C PORs where C is the number of cameras. In case of a simple averaging of these PORs to generate the overall POR, if there are still some outliers, the overall accuracy of the system will be affected. To bring more robustness against outliers a POR consistency based weighting as the post-estimation reliability is applied. The post estimation reliability is calculated as follows:

$$W_{post}^n = \frac{\sum_{i=1}^{N} \|PoR_n(x,y) - PoR_i(x,y)\|}{\sum_{i=1}^{N}\sum_{j=1}^{N} \|PoR_i(x,y) - PoR_j(x,y)\|}$$

After computing the normalized pre-estimation, $W_{pre}$, and post-estimation, $W_{post}$, weights for each POR are combined to generate an overall weight which is used in the following equation:

$$\sigma_n = \frac{W_{post}^n W_{pre}^n}{\sum_{i=1}^{N} W_{post}^i W_{pre}^i}$$

It will be appreciated that the gaze data 22 comprises an image stream of data at consecutive points in time. This data is sequentially processed by the gaze tracking module 6 to provide a stream of POR averaged data 36 at the consecutive points in time. The POR averaged data 36 is then acquired by the control module 8 to control the computer device 12. For example, a cursor may be moved on the display 20 of the display means 10 in real-time in accordance with the POR of the user. Moreover, it will be appreciated that the ocular feature extraction module 24 and POR calculation module 26 process, for each data point in time, the gaze data relating to each of the plurality of image sensors 18. This may be achieved by various program architectures, for example the gaze data may be processed concurrently, for example as an array, or sequentially.

The method of detecting the POR preferably begins with eye localization where existence of eyes is determined. The detected eyes are tracked continuously for smooth localization and computational efficiency. A face tracker such as a supervised descent method (SDM) can be used in order to detect, localize and track the eyes and provide the locations of the facial landmarks but also the head pose estimation. However, other types of face trackers such as AAM, CLM and OpenCV's Viola & Jones face and eye trackers may be used as face trackers.

In order to detect the pupil center, an IR LED can be located in the optical axis of a camera whereby the pupil is shown bright in an image. To get the bright pupil image, it is sufficient to turn on LEDs located in the optical axis of the camera.

To detect the pupil robustly, two images are used: one is taken when the corner LEDs on the monitor are turned on and the LEDs on the camera axis are turned off. The other is taken when the monitor LEDs are off and the camera LEDs are on. If these images are obtained from the camera in a very short interval, then the intensity difference of the pupil region in two images is large and the intensity difference of the region outside of the pupil is very small. Therefore, the difference image has high intensities in the pupil region. The pupil region can be extracted by a segmentation method that is similar to glint detection, and the center of gravity is considered as the pupil center.

The multiple camera tracking system according to the invention may be used with different algorithms other than the ones presented herein, for instance a different face tracker can be included into the system as an ocular image extraction algorithm, a different POR calculation algorithm rather than cross-ratio algorithm can be included, and a different POR averaging algorithm can also be used without departing from the scope of the invention. Moreover, other factors can be added or removed while computing confidence values. Important advantages of the invention arise from combining several cameras to increase the accuracy of eye tracking, for instance multiple cameras allow a higher working volume compare to a single camera system, in addition to improved overall accuracy and robustness against large head movements, changing illuminations and the use of eye glasses. The use of a plurality of light sources and sensors thus advantageously confers robustness and enables super resolution. Within the scope of the invention, different types of eye tracking methods, which may be per se known for single camera systems, can be used and combined, based on the individual estimations of reliability, to lead to improved accuracy. It may be further noted that one or more of the image sensors of the system could include a TOF camera that would help, in addition, for distance and posing.

The invention claimed is:

1. An eye gaze tracking system for determining a point of regard (POR) of a user, the system comprising:
   a gaze data acquisition system comprising a plurality of light sources and a plurality of image sensors, the plurality of light sources arranged to emit light to a head of the user, and the plurality of image sensors configured to receive light from the head of the user to capture gaze data thereof;
   a gaze tracking module comprising an ocular feature extraction module, a POR calculation module and a POR averaging module,
   wherein the ocular feature extraction module is configured to process the gaze data and to extract in relation to each image sensor a set of ocular features, and is further configured to determine, for each set of ocular features related to a captured frame, a confidence value associated with an accuracy of captured parameters; and
   wherein the POR calculation module is configured to determine an estimated POR value and the POR averaging module is configured to determine the confidence value of the estimated POR value, said confidence value being proportional to weight factors related to head pose angle of the user and feature detection reliability.

2. The system according to claim 1, wherein the POR calculation module is configured to determine an estimated POR value from the ocular features related to glint locations and location of pupil center for each image sensor independently.

3. The system according to claim 1, wherein the POR averaging module is configured to determine a corrected POR value from the confidence value and the estimated POR from each set of ocular features captured for each frame.

4. The system according to claim 3, wherein the POR averaging module is configured to determine a corrected POR value for each set of ocular features from a weighted average calculation based on the estimated POR's and the confidence values of each estimated POR.

5. The system according to claim 3, wherein the POR averaging module is configured to determine a corrected POR value for each set of ocular features based on the estimated PORs and the confidence values of each estimated POR, wherein only the corrected POR equals the estimated POR with the highest confidence value.

6. The system according to claim 1, wherein the eye gaze tracking system is further configured to determine a POR of a user on a display, wherein said display is in communication with a computer device.

7. The system according to claim 1, wherein the eye gaze tracking system is operationally connected to a computer device and the display, and wherein the determined POR is configured to be received in the computer device, such that a cursor or an item on the screen is following the POR of the user.

8. The system according to claim 1, wherein the gaze data acquisition system comprises four light sources located, each light source being located in each of four corners of a monitor, and one light source located in the optical axis of each camera sensor.

9. The system according to claim 1, wherein the image sensor is a camera configured to produce a stream of captured video data comprising the ocular data.

10. A method for determining a point of regard (POR) of a user, using a gaze data acquisition system comprising a plurality of light sources and a plurality of image sensors; said method comprising the steps of:
    Detecting a location of the eyes of a user by illuminating a facial region with the light sources and capturing reflected light with each image sensor,
    Continuously tracking the location of the eyes of the user once the location of the eyes has been detected,
    Measuring locations of glints by capturing the glints in the image sensors independently and calculating the coordinates of the glints in a POR calculation module,
    Measuring a location of the pupil by illuminating the pupil and capturing a reflected pupil image,
    Calculating an estimated POR value from the locations of glints in each eye and for each image sensor independently in a calculation module of the calculating unit,
    Determining for each image sensor a confidence value ($\sigma$) of the estimated POR, wherein captured parameters are compared to predetermined data ranges.

11. The method according to claim 10, wherein a corrected POR value is determined by using the confidence value as a weight factor and performing a weighted average calculation of the estimated POR's from the light sensors.

12. The method according to claim 11, wherein a corrected POR value is determined by analyzing the confidence value of each estimated POR, whereby only the estimated POR with the highest confidence value is considered for determining the corrected POR value.

13. The method according to claim 11, wherein the confidence value ($\sigma$) is calculated from head pose correction $W'''_{hp}$, feature detection reliability $W'''_{fd}$ and user distance $W'''_{ud}$, and wherein a separate confidence value $\sigma_n$ is calculated simultaneously for each estimated POR value from each image sensor and for each eye.

14. The method according to claim 11, wherein a total confidence value is determined by a pre-estimation of the confidence value based on gaze data and a post estimation of the confidence value, whereby the post estimation determines data outliers in the estimated PORs.

15. The method according to claim 10, wherein the locations of the eyes are only detected one time, preferably at the beginning of a session where after the eye positions are continuously tracked.

16. The method according to claim 10, wherein at least four glints are captured and entered in the gaze tracking module as corners of a trapezium.

17. The method according to claim 10, wherein the estimated POR value is calculated by a cross-ratio based module in which the image of the reflected image is compared to the geometry of the display.

* * * * *